(12) United States Patent
Wirz

(10) Patent No.: US 6,350,181 B1
(45) Date of Patent: Feb. 26, 2002

(54) PROCESS AND DEVICE FOR THE FINE MACHINING OF THE TOOTHED GEARS OF A GEARBOX

(75) Inventor: Walter Wirz, Pfaffikon (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/475,151

(22) Filed: Dec. 30, 1999

(30) Foreign Application Priority Data

Jan. 2, 1999 (DE) .......................................... 199 00 011

(51) Int. Cl.[7] .................................................. B24B 1/00
(52) U.S. Cl. ........................... 451/47; 451/63; 451/147; 451/161
(58) Field of Search ........................... 451/47, 63, 161, 451/147, 219, 253, 275, 900

(56) References Cited

U.S. PATENT DOCUMENTS

| | | | |
|---|---|---|---|
| 4,724,599 A | | 2/1988 | Corkin |
| 4,741,129 A | * | 5/1988 | Blake |
| 5,339,794 A | * | 8/1994 | Thyssen |
| 5,697,832 A | * | 12/1997 | Greenlaw et al. |

FOREIGN PATENT DOCUMENTS

| | | |
|---|---|---|
| DE | 1 821 102 | 9/1960 |
| DE | 196 25 370 | 4/1997 |

OTHER PUBLICATIONS

Bohrungsbearbeitung prazisions–geschmiedeter stirnzahnrader, by Tonshoff et al.,Antriebstechnik 36, 1997 pp. 78–81.
Simultanes Schleifen von Auben–und Innenkonturen, pp. 94,, fertigung Aug. 1994.
Immer produktiver verzahnen, by Kalhofer, Werkstatt und Betrieb 130 (1997) 12, pp. 1123–1125.

* cited by examiner

*Primary Examiner*—Timothy V. Eley
*Assistant Examiner*—Willie Berry, Jr.
(74) *Attorney, Agent, or Firm*—Sughrue Mion, PLLC

(57) ABSTRACT

The process describes how transmission gears (6) can be manufactured in a highly economical and highly precise manner. In one single mounting, the complete hard fine-machining on all of the most important functional surfaces of the workpiece is conducted simultaneously. This multi-process is made possible through the combined use of a continuous generating grinding process for the machining of gearing, a known method for the machining of the boring and possibly of a frontal surface, and the fixing of workpieces (6) on form elements such as chamfers or plane surfaces by means of centering elements (9, 10) which are designed in such a way that they do not block the free access of the individual tools (5, 11, 28) to the surfaces (7, 8, 27) to be machined.

7 Claims, 4 Drawing Sheets

PROCESS AND DEVICE FOR THE FINE MACHINING OF THE TOOTHED GEARS OF A GEARBOX

BACKGROUND OF THE INVENTION

The invention relates to a process and a device for the fine machining of the toothed gears of a gearbox.

The desire for weight reduction and noise reduction in motorized vehicles necessitates that also the gearboxes are manufactured more carefully and precisely. This leads to the necessity of having the gear teeth of gearbox gears, which until now had been often only shaved in the soft state and then hardened, undergo fine machining after hardening.

In conventional designs of today's manual shift transmissions, more than 70% of all toothed gears are disc-shaped, that is, the diameter is larger than the width, and they usually have a cylindrical boring.

The commonly and widely used technology for the manufacture of such typical transmission gears of motorized vehicles is thus the following process:

machining of the unmachined part on a lathe, boring with grinding allowance, rough forming of the gearing in the soft state with mounting in the pre-worked boring, hardening clamping of the gear in the teeth and grinding of the boring clamping of the gear in the boring and grinding of the teeth Both steps of the hard-fine machining are relatively elaborate and therefore expensive. That is also a reason why today still much gearing is shaved in the soft state to the finished dimensions instead of being hard fine-machined. The distortions produced during hardening are reluctantly accepted, while one attempts to minimize them using all possible countermeasures. As mentioned, however, in many modern transmissions, such gears which have only been shaved do not meet the requirements anymore.

The boring cannot remain without hard fine-machining, since mostly such a gear is guided with needle bearings on the gear shaft which requires a very precise and fine boring surface. For the machining of the boring, the workpiece is normally clamped in the pre-worked gearing to guarantee a good circular running to the boring. Precisely this clamping in the gearing, however, is delicate and expensive. It is not only that the means for the clamping of each gear have to be manufactured separately, but also that due to their complexity and tendency to become dirty and deteriorate they are not liked in mass production.

A good circular running is in all cases necessary, regardless of whether or not the teeth are hard-fine machined afterwards. If, however, a hard fine-machining of the teeth is provided, then again an expensive clamping means for a highly precise fixing in the boring is necessary. Such clamping means are mostly designed as hydraulic expandable clamping arbor with a cylindrical mounting zone.

SUMMARY OF THE INVENTION

It is the object of the present invention to disclose a process and a device with which the hard fine-machining of the transmission gears of motorized vehicles can be rationalized and improved and which manages with far simpler and less expensive clamping means.

According to the invention, the machining of the teeth and of the boring of gears is performed in the same fixing and simultaneously. In doing so, the fixing of the workpiece is designed in such a way that the surfaces to be machined remain freely accessible to the appropriate tools. Besides the time savings in the manufacturing, in doing so, automatically a minimum runout between the boring and the gearing is achieved; also the expensive fixing means for clamping the workpiece in the gearing as well as thereafter in the boring for the grinding of the gearing are eliminated.

The implementation of the process according to the invention is made possible thanks to several specific characteristics on disc-shaped gears, as can be found in, for example, the transmissions of motorized vehicles, and the availability of the continuous generating grinding process which requires a rapid and continuous rotation of the workpiece for the machining process. The rotational movement is used simultaneous with the machining of the gear in order machine the boring in a known manner, for example, through internal grinding or honing.

As mentioned above, according to current practice, the hardened workpieces are in most cases clamped in the gearing for the grinding of the boring. This is mainly for manufacturing-related technical reasons. On the one hand, such workpieces can hardly be fixed differently for this machining; on the other hand, the hard machining of the gearing to follow it is an elaborate and expensive process, and therefore one attempts to keep the machining allowance as small as possible. In order to obtain a proper grinding of all of the tooth flanks despite small machining allowance, it is thus necessary to machine the boring as precisely as necessary running concentric to the pre-machined gearing. It is obvious that the precision of such a clamping in the gearing has its limits, since the distortions by hardening cannot be avoided. Clearly functional reasons speak for the highly precise fixing of the workpieces in the boring for the fine machining of the gearing; it is exactly here where the running quality of the gear is to be produced.

If the workpiece is fixed in such a way that the gearing and the boring can be machined simultaneously, one can avoid the highly precise mounting because a perfect circular running between both of tie functional surfaces is automatically produced.

Such a mounting can be achieved if both chamfers of the boring or one chamfer and a plane surface or the outer surface of a hub or a collar of the workpiece is used for centering by means of flitting centering pieces, wherein at least the centering piece on the side of the boring machining tool must have a through-boring.

BRIEF DESCRIPTION OF THE DRAWINGS

In the following, embodiment examples of the invention are explained with reference to the drawings in which.

DETAILED DESCRIPTION OF THE PREFERRED EMBODIMENTS

Figure 1:
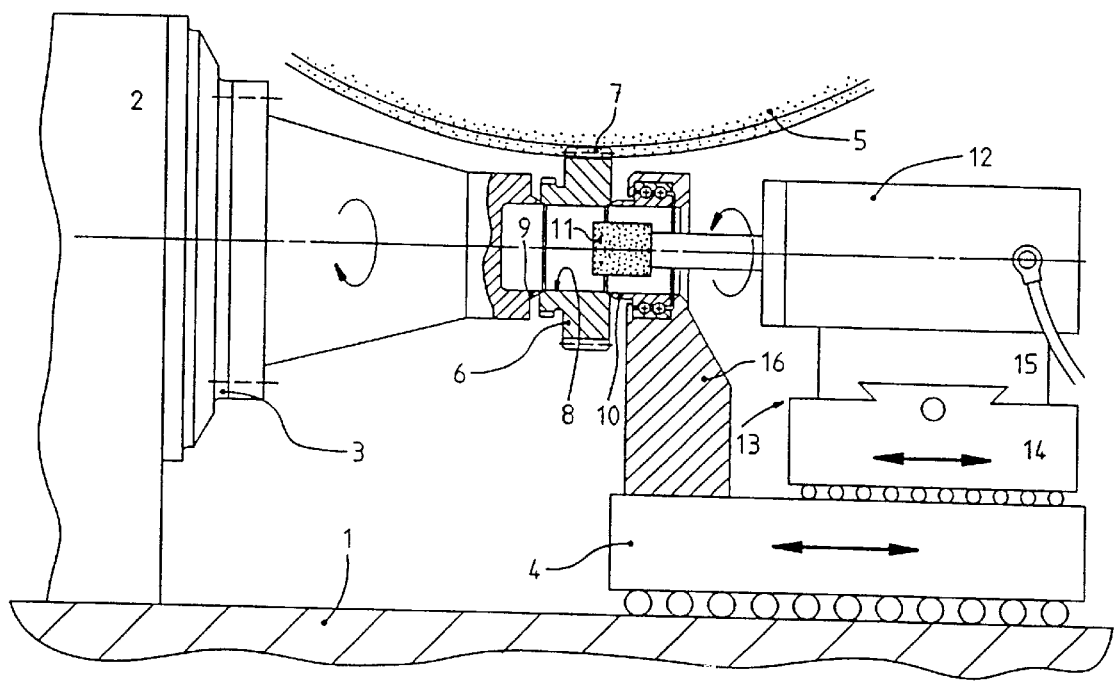
FIG. 1 shows one version of the arrangement of the machine components for the implementation of the process according to the invention.

FIG. 1 shows a first embodiment of the invention. On a continuously working gear grinding machine with workpiece slide 1, spindle head 2 with workpiece spindle 3 and tailstock 4, the workpiece 6 is ground in its gearing 7 by means of a worm-shaped profiled grinding wheel 5 and simultaneously in its boring 8. The workpiece 6 is mounted between the driven centering 9 acting as a driver which is clamped in the workpiece spindle 3, and the idle tailstock centering 10. For the movements of the tool 11 on the inner grinding spindle 12 for the grinding of the boring 8 of the workpiece 6, arranged on the tailstock slide 4 is a cross slide 13 consisting of the feeding slide 15 and the slide 14 for the stroke of the tool 11. The tailstock centering 10 is rotatably supported in the holder 16 which, in turn, is tightly screwed onto the tailstock slide 4.

Figure 2:
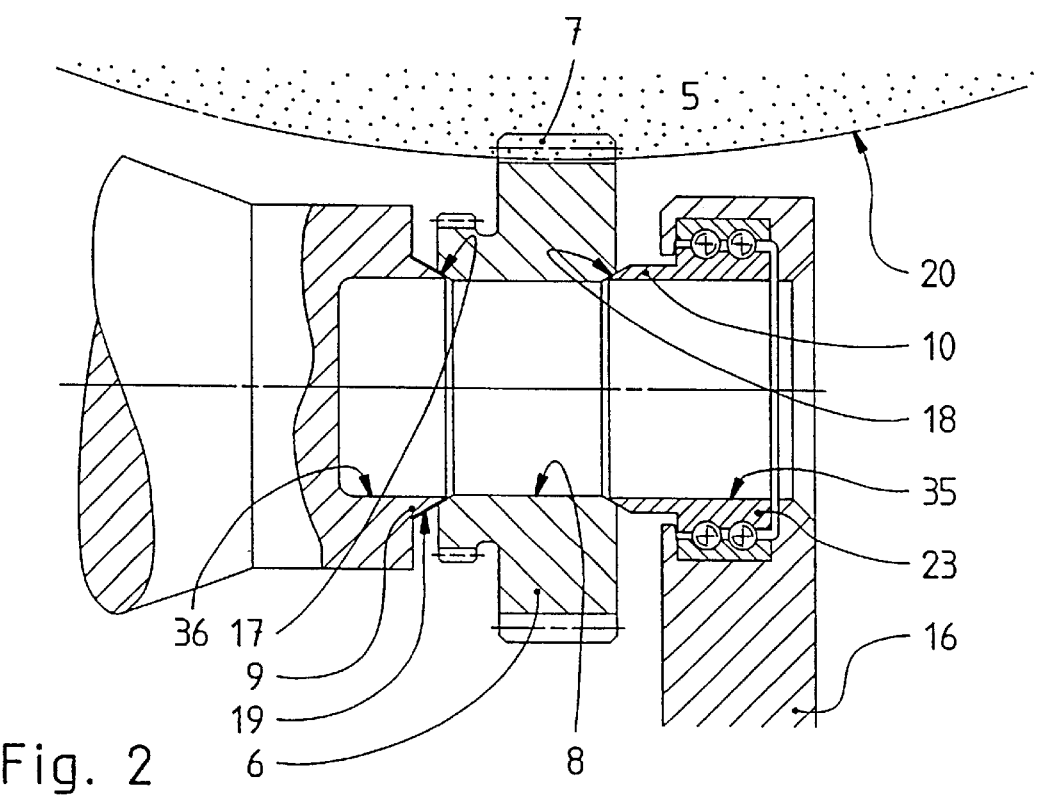
FIG. 2 shows an enlarged cross-section from the illustration according to FIG. 1.

FIG. 2 shows an enlarged cross-section. The workpiece 6 is fixed using centerings 9 and 10 in its machining position over its two chamfers 17 and 18 on the faces of the boring. The opposite surface of the chamfer 17 at the idler 9 within the range of its support zone 19 is covered with a covering made of fine diamond or another hard material grains. In doing so, the torque necessary for providing the machining force, especially for the generating grinding of the gearing 7, is slip-free transferred to the workpiece. The axial pressing force for achieving the necessary torque is applied by the centering 10 through the bearing 23 from the holder 16. Not only the centering 9 but also the holder 16 are designed such that they lie outside of the collision contour 20 of the grinding worm 5. The centering 10 has a coaxial throughboring 35 and the centering 9 has a coaxial terminal boring 36. Both borings 35, 36 are slightly larger than the finished diameter of the boring 8 of the gear 6. This is for an unhindered accessability of the bore by the tool.

Figure 3:
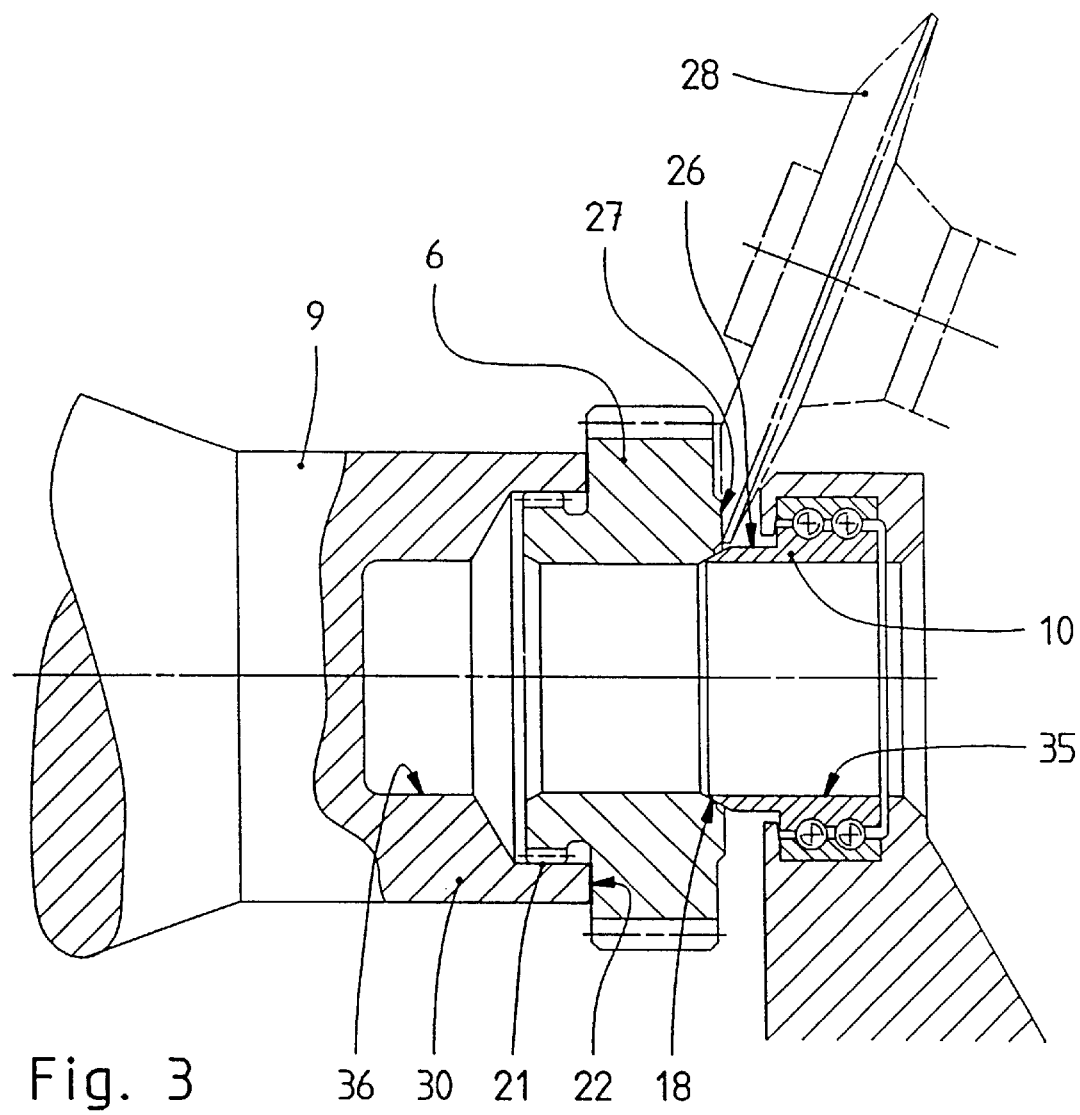
FIG. 3 shows a version of a workpiece fixing with planar-side support and centering over a chamfer of the boring.

In FIG. 3, the workpiece is mounted by means of centering 10 and 30 into its machining position. In comparison to the variant of FIG. 2, in this case, the workpiece 6 is held through the driving side centering 30 not in the chamfer of the boring, but instead is centered at the usually available coupling gearing 21 and is driven by the ring-shaped face 22 which, in turn, is covered with hard-material grains. On the side of the tailstock, the workpiece is, just as shown in FIGS. 1 and 2, supported on its chamfer 18. Via this chamfer 18, again the axial force necessary to ensure the drive transmission of the workpiece over the frontal surface 22 is provided.

Figure 4:
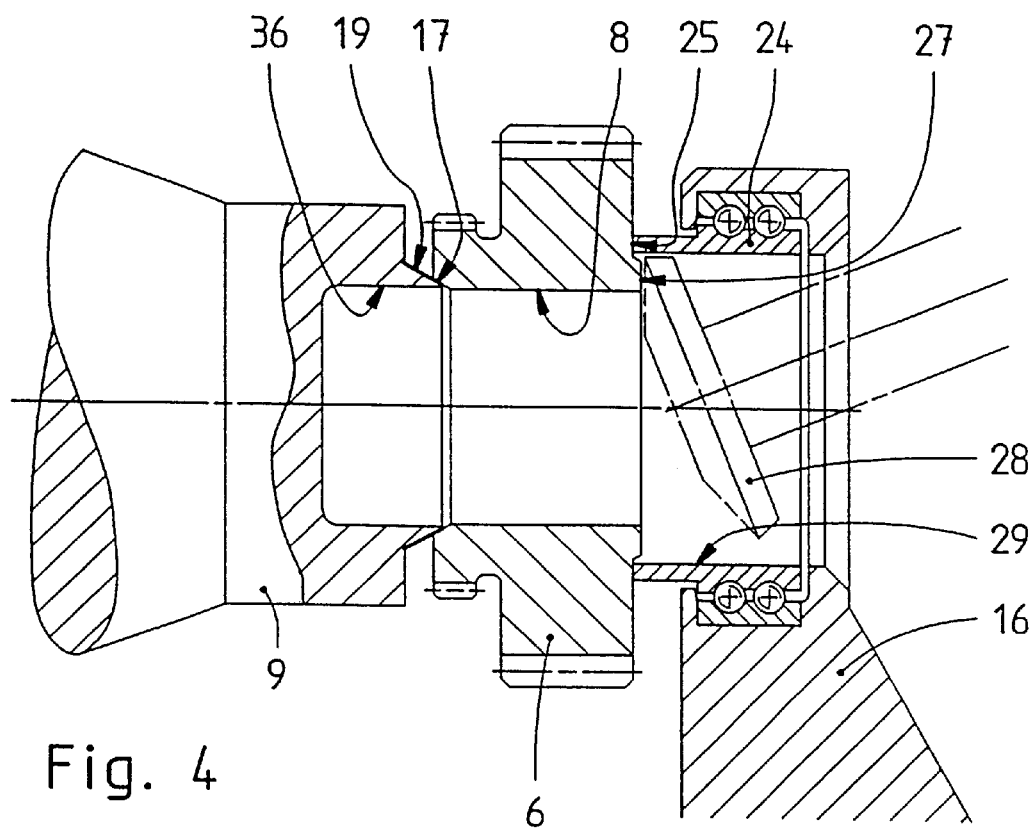
FIG. 4 shows a version of a workpiece fixing similar to FIG. 3, however, with exchanged centering pieces.

In FIG. 4, another version of a workpiece fixing is illustrated in which the workpiece 6 is centered on the driving side in the chamfer 17 of the boring 8 by means of a hard-material grain covered carrier surface 19 and is supported on the side of the tailstock by a counter bearing 24 over the face 25 and the holder 16.

The described types of fixings of the workpiece according to FIGS. 2 to 4 require a certain minimal size of the corresponding chamfers at the workpiece, so that the centering can properly be assured. As a rule, a slight enlargement of the chamfer can be preformed well because, in the built-in state of the gear in the area of the ends of the borings, the cages of the needle bearings are located and therefore these zones of the boring are not used. The inner diameter of the centering 9 and 10 is purposely arranged to be slightly larger than the finishing diameter of the workpiece boring 8, so that the tool can machine inward unhindered.

If a plane surface 27 on the workpiece 6 (refer to FIGS. 3 and 4) should be machined in the same mounting, the outer or inner diameter 26, 29 of the centering 10, 24 has to be dimensioned such that a plane machining tool 28 has unhindered access for machining of the surface 27. In the version according to FIG. 3, the tool 28 is of course displaced in the circumferential direction with respect to the grinding worm 5, such that the machining can be performed simultaneously. With a correspondingly available arrangement, for example, an additional grinding spindle with plane grinding disc, also this machining operation can be conducted at the same time as the other two, by which means an exact circular and plane running of all important functional surfaces on the workpiece can be ensured.

What is claimed is:

1. A device for the fine machining of functional surfaces on pre-machined and hardened transmission gear workpieces, comprising:
   a) a work piece spindle (3), in which a driver (9) is mounted with a first carrier surface (19, 22),
   b) a tailstock (16), and
   c) a counter-holder (10, 24) with a second carrier surface (18, 25) rotatably mounted in the tailstock with respect to an axis of the device,
   d) wherein the tailstock is movable with respect to the workpiece spindle and a gear (6) is clamped between both of the carrier surfaces and is centered at the driver and/or at the counter-holder, and
   e) wherein the counter-holder has a through-boring (29, 35) running coaxial to said axis, through which an inner machining tool (11) is guided for the machining of a boring (8) of the gear, as well as a grinding spindle for mounting a grinding worm (5) with which the gearing (7) is machined simultaneously.

2. A device according to claim 1, wherein at least one of the carrier surfaces (18, 19) is frusto-concial for gripping into a chamfer (17, 19) of the workpiece.

3. A device according to claim 1, wherein at least one of the carrier surfaces (22, 25) is a plane surface.

4. A device according to claim 1, wherein the first carrier surface is coated with hard-material grains.

5. A device according to claim 1, wherein a transfer of torque from the workpiece spindle to the gear is performed exclusively via a frictional engagement of the first carrier surface.

6. A device according to claim 1, wherein a diameter of the through-boring is larger than a diameter of the boring of the gear.

7. A device according to claim 1, wherein the drive has a coaxial terminal boring (36) a diameter of which is larger than a diameter of the boring of the gear.

* * * * *